(12) United States Patent
Kriaras et al.

(10) Patent No.: US 7,149,194 B2
(45) Date of Patent: Dec. 12, 2006

(54) TELEPHONE SYSTEMS

(75) Inventors: Ioannis Kriaras, Bradenstoke (GB); Sudeep Kumar Palat, Grange Park (GB); Hatef Yamini, Swindon (GB); Jin Yang, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 930 days.

(21) Appl. No.: 09/854,962

(22) Filed: May 14, 2001

(65) Prior Publication Data

US 2002/0015394 A1 Feb. 7, 2002

(30) Foreign Application Priority Data

May 19, 2000 (EP) .................................. 00304249

(51) Int. Cl.
*H04Q 7/00* (2006.01)
*H04L 12/66* (2006.01)
*H04L 12/56* (2006.01)

(52) U.S. Cl. .................. 370/328; 370/352; 370/401

(58) Field of Classification Search ............... 370/252, 370/329, 349, 330, 431, 328, 389, 401
See application file for complete search history.

(56) References Cited

U.S. PATENT DOCUMENTS

| | | | |
|---|---|---|---|
| 5,905,719 A * | 5/1999 | Arnold et al. | 370/330 |
| 5,970,059 A | 10/1999 | Ahopelto et al. | 370/338 |
| 5,978,386 A | 11/1999 | Hamalainen et al. | 370/466 |
| 6,167,040 A * | 12/2000 | Haeggstrom | 370/352 |
| 6,353,607 B1 * | 3/2002 | Valentine et al. | 370/349 |
| 6,434,140 B1 * | 8/2002 | Barany et al. | 370/352 |
| 6,553,219 B1 * | 4/2003 | Vilander et al. | 455/411 |
| 6,577,637 B1 * | 6/2003 | Sieppi | 370/401 |
| 6,577,862 B1 * | 6/2003 | Davidson et al. | 370/433 |
| 6,603,738 B1 * | 8/2003 | Kari et al. | 370/230.1 |
| 6,608,832 B1 * | 8/2003 | Forslow | 370/353 |
| 6,662,010 B1 * | 12/2003 | Tseitlin et al. | 455/426.1 |
| 6,721,278 B1 * | 4/2004 | Rimhagen et al. | 370/252 |
| 6,751,477 B1 * | 6/2004 | Alperovich et al. | 455/560 |
| 6,763,233 B1 * | 7/2004 | Bharatia | 455/433 |
| 2001/0031635 A1 * | 10/2001 | Bharatia | 455/432 |

FOREIGN PATENT DOCUMENTS

WO   WO 99/12329   3/1999

OTHER PUBLICATIONS

Media Gateway Control Protocol And Voice Over IP Gateways, L. P. Anquetil et al. XP-000830045, pp. 151-156.
European Search Report dated Oct. 26, 2000.

* cited by examiner

*Primary Examiner*—Chi Pham
*Assistant Examiner*—Tri H. Phan

(57) ABSTRACT

A mobile telephone system is provided with a new architecture for dealing with voice internet protocol traffic.

Real time traffic from mobile stations (22) is routed by a public land mobile telephone network internet protocol core (20) directly to one of two media gateways (28,32) respectively serving a plain switched telecommunication network/integrated services digital network (26) and an internet protocol backbone (30) without passing through the usual general packet radio system (GPRS) specific gateway.

10 Claims, 3 Drawing Sheets

TELEPHONE SYSTEMS

CROSS-REFERENCE TO RELATED APPLICATION

This application claims priority of European Patent Application No. 00304249.6, which was filed on May, 19, 2000.

BACKGROUND OF THE INVENTION

1. Field of the Invention

The present invention relates to telephone networks and, in particular but not exclusively, telephone networks for mobile telephone systems.

2. Description of the Prior Art

The structure of telephone networks employing third generation internet protocol industrial focus group architecture (3G IP) and third generation partnership project architecture (3G PP) is such that any voice internet protocol traffic (VoIP) goes through a fairly lengthy route within the network. Thus, for example as shown in FIG. 1, VoIP traffic originating at a mobile station ($T_1$) 2 and destined for a target station ($T_2$) 14 takes the following route; starting from the mobile station 2, traffic is passed by a radio network controller (RNC) 4 to a serving GPRS (general packet radio system) support mode SGSN 6. From there the signal is passed by a gateway GPRS support node (GGSN) 8 to a media gateway (MGW) 12, when a public switch telephone network (PSTN) is met or when transcoding is required, following which the destination of the target telephone ($T_2$) 14 is reached.

The traffic handling using the path as outlined above can be very inefficient.

So far there is no co-ordination between choice of GGSN and VoIP media gateway (MGW). The determination of GGSN (when setting up PDP bearer) and choice of MGW (determined by application level call control) are two independent procedures. However, as the traffic has to pass these two points, the determined GGSN and MGW can result in a less than optimum traffic route. For example, this would happen when the mobile station (MS) GGSN and MGW form a triangle.

In the public land mobile network (PLMN) (eg the mobile telephone operators network) traffic has to pass through a first interface Iu-ps between the RNC 4 and the SGSN 6, a second interface Gn between the SGSN 6 and the GGSN 8. As a result, the user packet acquired the following protocol headers or series of codes; real time transport protocol/user datagrams protocol/internet protocol/GPRS tunnelling protocol/user data gram protocol/internet protocol/L1, 2 (RTP/UDP/IP/GTP/UDP/IP/L1,2). The result is that for real time or voice message, the resource usage is low (about 25%).

It is an object of the present invention to provide an improved network architecture.

SUMMARY OF THE INVENTION

According to the present invention there is provided a mobile radio system comprising a plurality of mobile stations linked to a radio network controller, a first network comprising a public switched telephone network and/or an integrated services digital network, a second network comprising a public internet system, a first real time media gateway providing access to and from the first network, a second real time media gateway providing access to and from the second network, and a third general packet radio system (GPRS) specific gateway providing access to and from the second network, an internet protocol network which responds to the address in the headers of the data stream flowing between the radio network controller and its destination to direct the data stream to its destination through a one of said first, second and third gateways, selected in accordance with the nature of the data in the data stream whereby real time data is directed through either said first or said second gateway without passing through said third gateway.

BRIEF DESCRIPTION OF THE DRAWINGS

A mobile telephone network embodying the present invention, will now be described, by way of example, with reference to the accompanying diagrammatic drawings, in which.

DESCRIPTION OF THE PREFERRED EMBODIMENT

Figure 1:
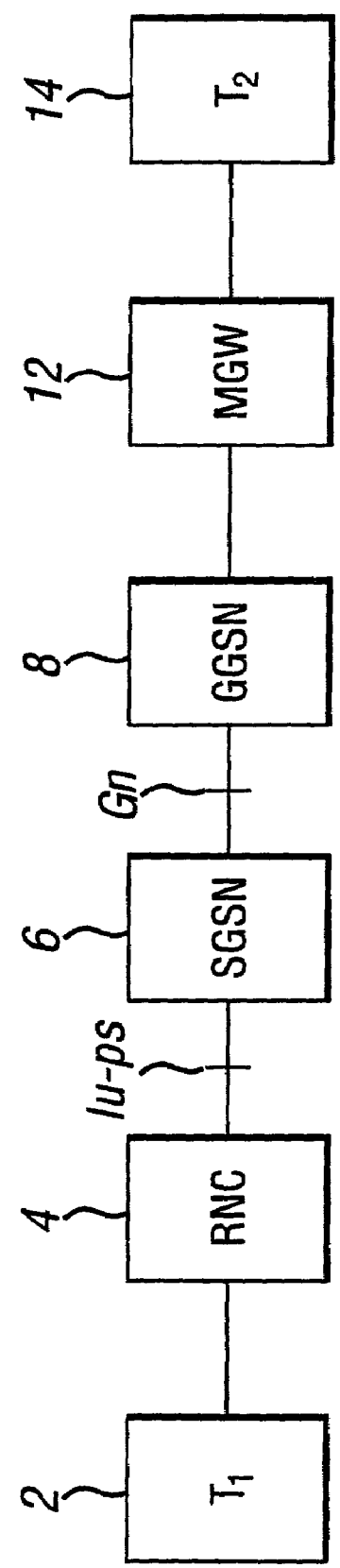
FIG. 1 is a block diagram of the main components of an existing network.
Figure 2:
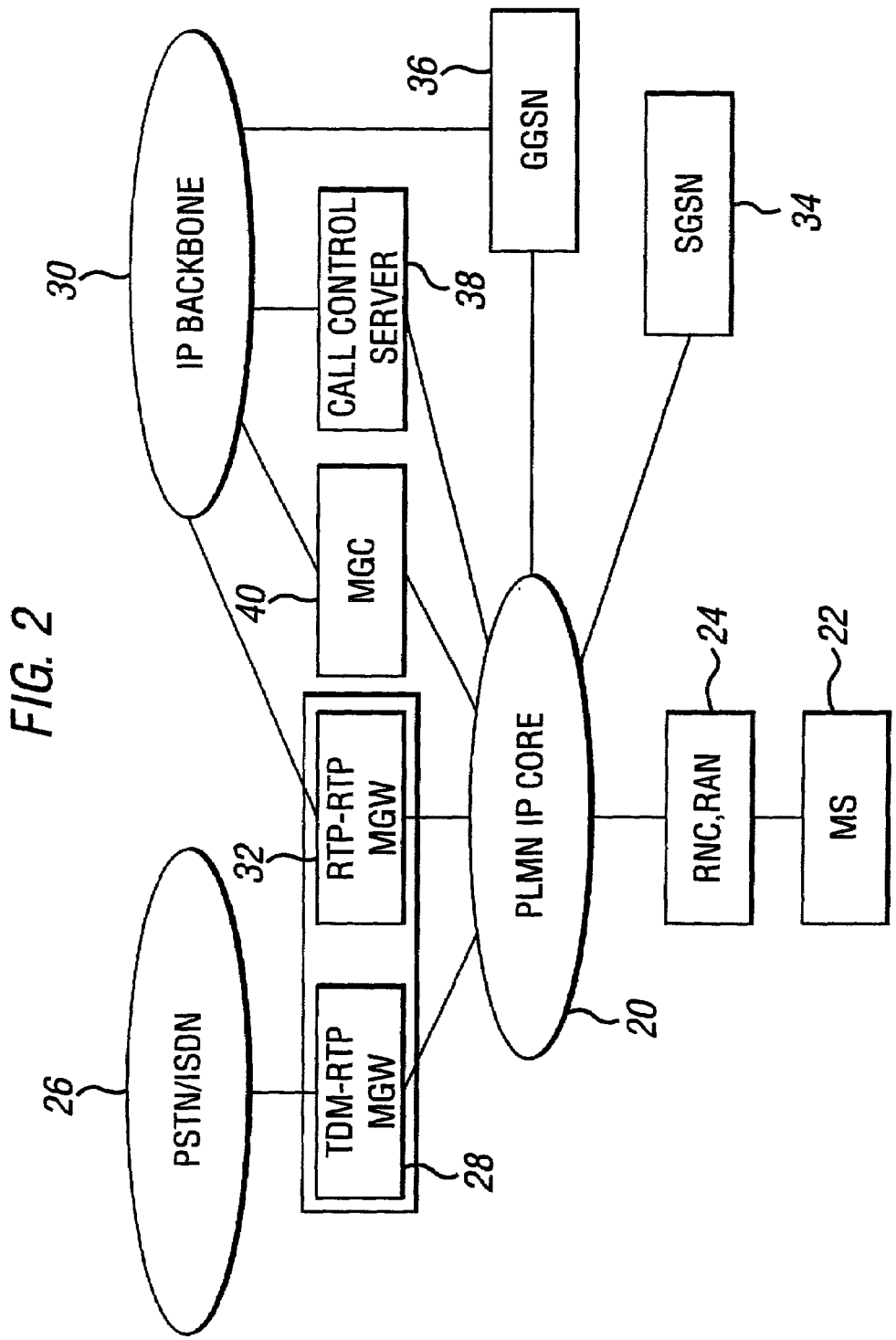
FIG. 2 is a block diagram of a network embodying the invention, showing the physical connections between the main components of the network.

The network shown in FIG. 2 includes a PLMN internet protocol (IP) core or cloud 20. This core 20 is connected to a mobile station 22 through a radio network controller (RNC)/radio access network (RAN) 24. The PLMN IP core 20 is coupled to plain switched telecommunication network (PSTN)/integrated services digital network (ISDN) 26 through a time division multiplexing—real time transport protocol, media gateway (TDM-RTP), MGW 28.

The PLMN IP core 20 is connected to an internet protocol IP backbone network 30 by two routes. A first route involves a real time transport protocol—real time transport protocol media gateway (RTP-RTP-MGW) 32 while the second route involves an SGSN 34, a GGSN 36. A media gateway controller 40 controls the routes.

It will thus be seen that voice internet protocol traffic can now reach the IP backbone 30 by incurring less header content.

Figure 3:
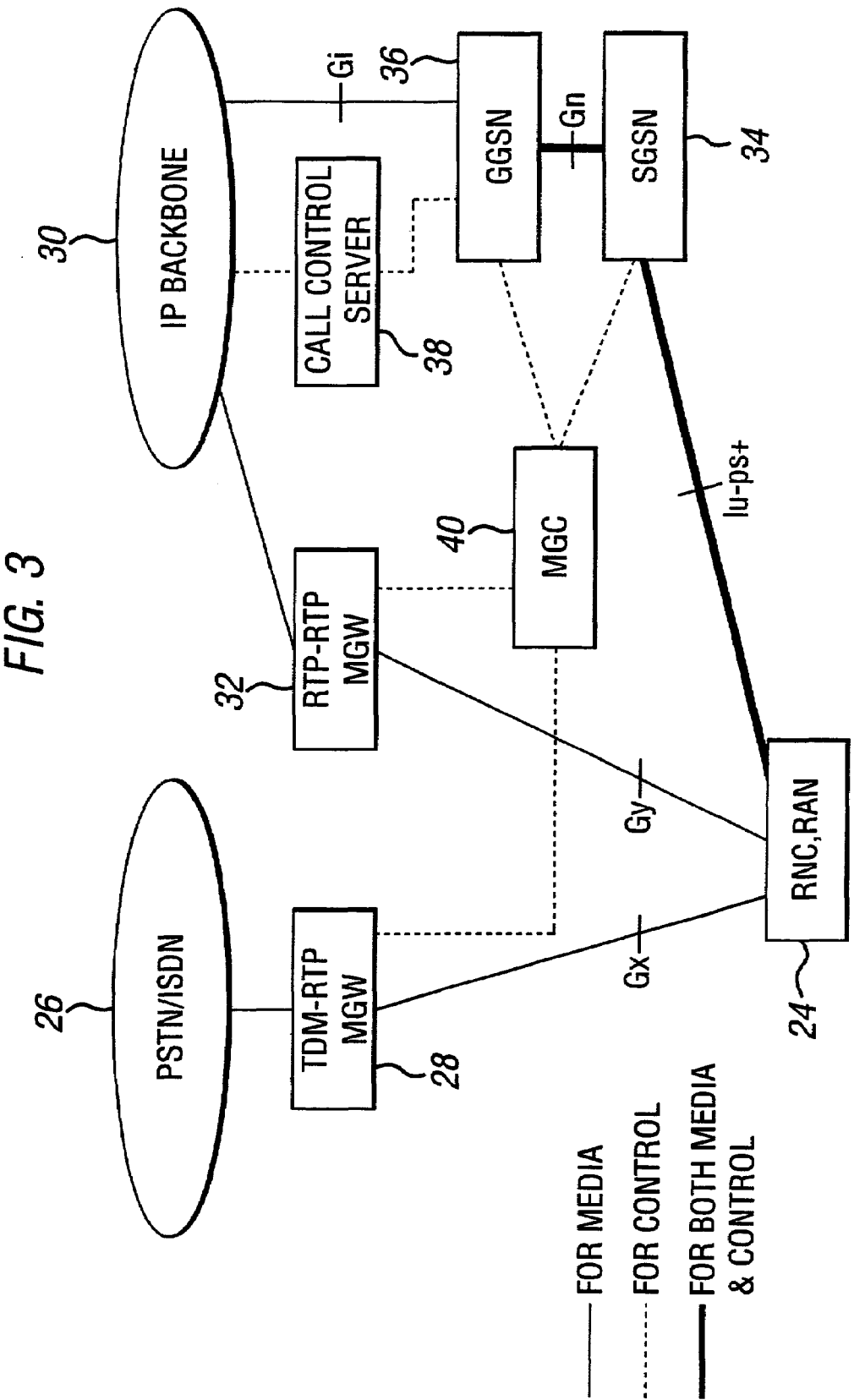
FIG. 3 is a block diagram illustrating the logical connection between the main components of the network of FIG. 2.

FIG. 3 illustrates the logical connections between the components shown in FIG. 2 with control connections being shown in broken lines, media connections being shown in a single continuous line and media and control connections being shown in parallel lines, one thick one thin.

The interfaces between the units are as follows. Gx is the interface between the RNC 24 and the MGW 28, Gy is the interface between the RNC 24 and the MGW 32. Iu-ps is the interface between the RNC 24 and the SGSN 34. Gn is the interface between the SGSN 34 and the GGSN 36 and Gi is the interface between the GGSN 36 and the IP backbone 30.

As can be seen, since the MGWs 28 and 32 are connected to the RNC 24 through the PLMN IP core 20, any MGW can talk to any RNC within a single management (mobile operators) domain.

It will be appreciated that the VoIP flow goes through one of the MGW's 28, 32 which is connected to the PLMN IP core network 20. If the call traffic is going to the PSTN/ISDN network immediately, a RTP-TDM gateway 28 will be used. Otherwise, if traffic is going to another internet protocol end point which can include an PSTN/ISDN gateway, then the RTP-RTP GW 32 should be used. Both types of MGW 28 and 32 can perform transcoding functions.

The MGW for each VoIP flow will be the anchoring point during each communication session. The selected MGW can switch the VoIP flow from one RNC 24 to another in the same system under the control of the MGC 40 which itself receives instructions from the SSGN 34 and from the GGSN 36.

Changes may be made in the combination and arrangement of the elements as herein before set forth in the specification and shown in the drawings, it being understood that changes may be made in the embodiment disclosed without departing from the spirit and scope of the invention and defined in the following claims.

The invention claimed is:

1. A mobile radio system comprising;
   a plurality of mobile stations linked to a radio network controller;
   a first network comprising at least one of a plain switched telephone network and an integrated services digital network;
   a second network comprising a public internet system;
   a first real time media gateway providing access to and from the first network, a second real time media gateway providing access to and from the second network, and a third general packet radio system (GPRS) specific gateway providing access to and from the second network; and
   an internet protocol connection system which responds to the address in the headers of the data stream flowing between the radio network controller and its destination to direct the data stream to its destination through a one of said first, second and third gateways, selected in accordance with the nature of the data in the stream whereby real time data is directed through either said first or said second gateway without passing through said third gateway, wherein the first and second gateways comprise a common gateway.

2. A system according to claim 1, wherein said first gateway is a time division multiplexing to real time transport protocol media gateway.

3. A system according to claim 1, wherein said second gateway is real time transport protocol to real time transport protocol media gateway.

4. A system according to claim 1, wherein the third gateway is a gateway GPRS support node (GGSN).

5. A system according to claim 1, wherein the internet protocol connection system comprises a public land mobile telephone network internet protocol core network.

6. A system according to claim 1, wherein the path from the radio network controller to the third gateway involves a serving GPRS service node (SGSN).

7. A system according to claim 6, including a media gateway controller for controlling said first, second and third gateways and said SGSN.

8. A system according to claim 1, including a call control server for controlling calls between said third gateway and said second network.

9. A mobile radio system comprising:
   a plurality of mobile stations linked to a radio network controller;
   a first network comprising at least one of a plain switched telephone network and an integrated services digital network;
   a second network comprising a public internet system;
   a first real time media gateway providing access to and from the second network, a second real time media gateway providing access to and from the second network, and a third general packet radio system (GPRS) specific gateway providing access to and from the second network; and
   an internet protocol connection system which responds to the address in the headers of the data stream flowing between the radio network controller and its destination to direct the data stream to its destination through a one of said first, second and third gateways, selected in accordance with the nature of the data in the stream whereby real time data is directed through either said first or said second gateway without passing through said third gateway, wherein the path from the radio network controller to the third gateway involves a serving GPRS service node (SGSN), the system comprising a media gateway controller for controlling said first, second and third gateways and said SGSN.

10. A mobile radio system comprising:
    a plurality of mobile stations linked to a radio network controller;
    a first network comprising at least one of a plain switched telephone network and an integrated services digital network;
    a second network comprising a public internet system;
    a first real time media gateway providing access to and from the first network, a second real time media gateway providing access to and from the second network, and a third general packet radio system (GPRS) specific gateway providing access to and from the second network; and
    an internet protocol connection system which responds to the address in the headers of the data stream to its destination through a one of said first, second and third gateways, selected in accordance with the nature of the data in the stream whereby real time data is directed through either said first or second gateway without passing through said third gateway, the system including a call control server for controlling calls between said third gateway and said second network.

* * * * *